United States Patent [19]

Shaw et al.

[11] 4,073,214
[45] Feb. 14, 1978

[54] SHAVE FORMING OF WIRE

[75] Inventors: Milton C. Shaw, Pittsburgh, Pa.;
Tetsutaro Hoshi, Kyoto, Japan

[73] Assignee: Carnegie-Mellon University, Pittsburgh, Pa.

[21] Appl. No.: 719,592

[22] Filed: Sept. 1, 1976

[51] Int. Cl.² .................. B23D 1/00; B23D 3/00; B23D 5/00
[52] U.S. Cl. ................................ 90/24 D; 29/4.51
[58] Field of Search ............... 29/4.51, 4.52; 90/24 R, 90/24 D

[56] References Cited

FOREIGN PATENT DOCUMENTS 679,254  9/1952  United Kingdom ............... 90/24 R Primary Examiner—Othell M. Simpson
Attorney, Agent, or Firm—Buell, Blenko & Ziesenheim

[57] ABSTRACT

Wire is produced from wire rod by moving the rod lengthwise through first and second cutting tools, the first of which gouges out continuous chips from the rod surface, leaving lands between the grooves so formed, and the second shaves off those lands.

6 Claims, 5 Drawing Figures

SHAVE FORMING OF WIRE

This invention relates to the manufacture of wire from wire rods. It is more particularly concerned with a method and apparatus for shaving continuous wire chips from the rod surface.

Wire is conventionally made from wire rod by cold drawing the rod through a succession of dies of progressively smaller diameter. While the conventional method is time tested and capable of producing wire in large volume, it cold works the entire rod cross section at each draft, although bringing about only a relatively small reduction of area per draft. In this respect the process is rather wasteful of energy. Furthermore, the cold working hardens the rod so that it must be annealed at intervals. Annealing requires the wire to be coiled for heating and uncoiled thereafter for further drafting. The unit costs of the multiple block wire drawing machines and the annealing furnaces and auxiliary apparatus are relatively high, and a large stock of dies must be maintained. Those units have high productivity, but the result is that expansion of plant must take place in rather large increments.

It is an object of our invention to provide a process of producing wire in quantity having relatively low energy requirements as compared with the conventional process.

It is another object to provide a process requiring inexpensive apparatus.

It is another object to provide a process which requires no heat treating step.

It is still another object to provide a process which permits expansion of plant capacity in small increments.

It is yet another object to provide a tool for carrying out our process.

Other objects of our invention will appear in the course of the description thereof which follows.

Our process comprises producing wire by shaving continuous chips from a wire rod lengthwise thereof. It is carried out in two successive stages. In the first stage a plurality of such chips are shaved from a smooth rod surface, spaced from each other to leave lands between the grooves formed in the rod. In the second stage the lands are shaved off to make additional chips, leaving the rod of reduced diameter, but again with a smooth surface. The reduced diameter rod can be put through additional cycles of the process above described, and when it reaches a diameter too small for further processing it is drawn down in conventional apparatus.

Our process will be more easily comprehended by reference to the attached Figures.

Figure 1:
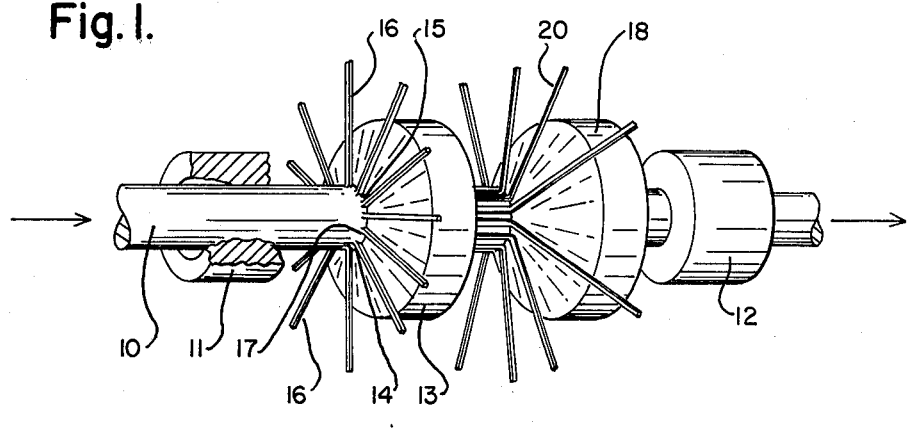
FIG. 1 is an isometric drawing of a rod being processed in accordance with our invention, using processing apparatus of simplified form.
Figure 2:
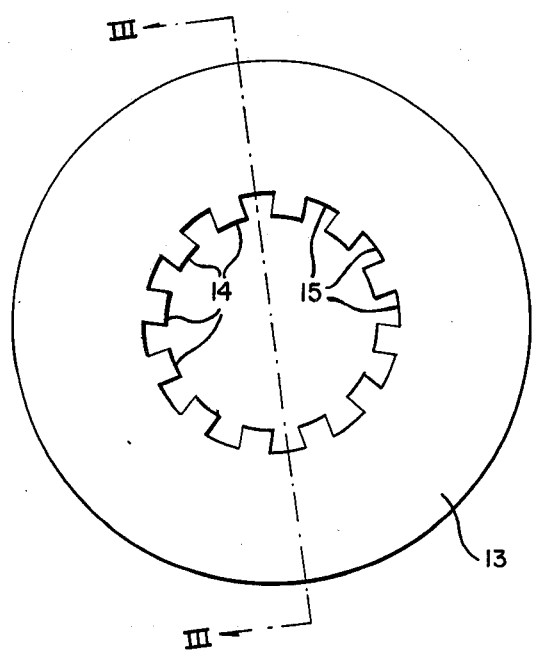
FIG. 2 is a front elevation of a cutting tool for the first stage of our process.

The rod 10 is pulled in the direction of the arrow of FIG. 1 through a front guide bush 11 and a rear guide bush 12 spaced from front bush 11. Following first guide bush 11 is a first stage cutting tool 13 which is circular in form with a central hole through which the rod passes and is formed with a plurality of cutting edges 14 spaced around the central opening and extending radially toward the center a distance greater than that of the areas 15 between edges 14. Twelve such edges are shown in FIG. 2. As rod 10 is pulled through the opening in tool 13 each edge 14 shaves or gouges a continuous metal chip 16 out of the surface of rod 10, leaving a land 17 of uncut metal between each pair of grooves from which chips 16 have been shaved. The continuous chips or strands 16 are pushed away from the rod 10 across the face 19 of cutting tool 13 by the travel of rod 10 through the central opening in the tool, and are wound up on reels.

The rod leaving cutting tool 13 passes through a second stage cutting tool 18 which is similar to first stage tool 13 with the exception that tool 18 is formed with a continuous circular cutting edge around its central opening. Tool 18 shaves off the projecting lands 17 left on rod 10 by the first tool 13. The continuous chips or strands 20 so removed travel across the face of cutting tool 18 and are wound up on reels. Preferably the dimensions of and spaces between the cutting edges 14 of tool 13 and the depth of cut of tools 13 and 18 are adjusted so that strands 16 and strands 20 are of about the same cross-sectional area. This cross section is most conveniently made more or less square or rectangular, and if round wire is desired, the strands are subsequently drawn through circular dies.

Rod 10 of reduced diameter having been shaved as above described may be subjected to additional cycles of processing as above described, through appropriately dimensioned cutting tools. When the rod has been reduced to a diameter too small for further shaving, it may be drawn down to a desired size through conventional dies in the conventional manner.

Figure 3:
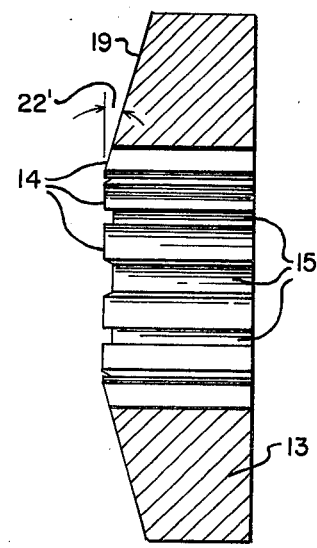
FIG. 3 is a cross section through the tool of FIG. 2 taken on the plane III—III.

The gouging or shaving action of our process as above described works the continuous chips so produced so as to upset them, that is, the thickness of the resulting chip is greater than the depth of cut, and correspondingly the length of the upset chip is less than that of the unworked metal. We have found for copper wire that the greater the ratio of upset strand length to unworked metal length, the better is the quality of the wire produced. A ratio of 0.35 or greater, preferably greater than 0.50, produces continuous chips without cracks. That ratio is dependent in considerably degree on the rake angle of the cutting face of the tool, that is, the angle between the cutting face of the tool and a normal to the rod. Angle 22 in FIG. 3 is the rake angle of cutting tool 13 there illustrated. For copper rod it is preferable to adjust the rake angle of tool 18 to be greater than that of tool 13.

Figure 4:
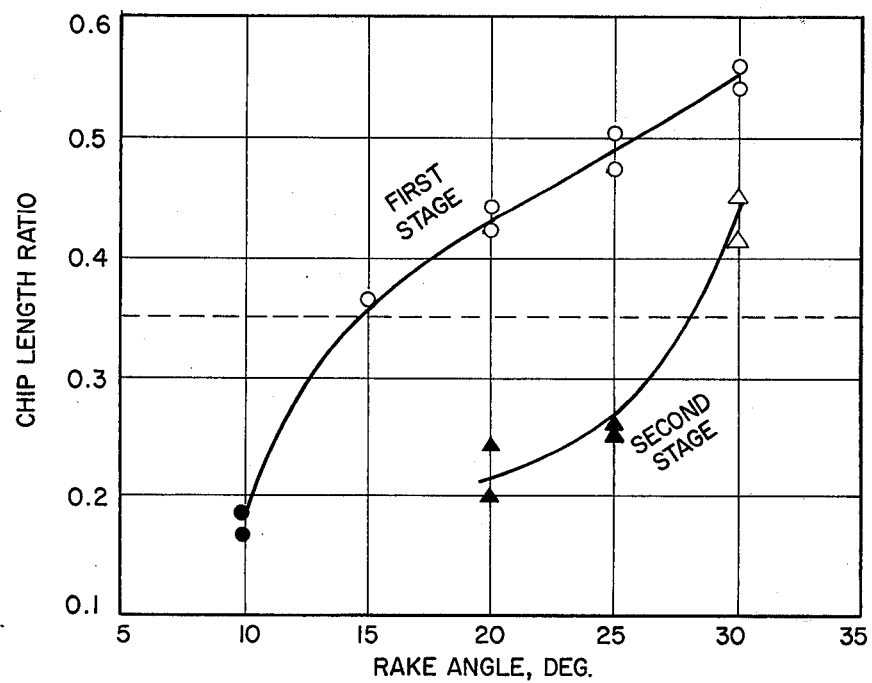
FIG. 4 is a graph of the effect of the rake angle of the tool on the relative length of the chip produced in both the first and second stages of our process.

The metal removed by tool 13 is constrained on both sides whereas the metal removed by tool 18 is unconstrained. FIG. 4 illustrates the relation between rake angle and chip length for both first stage tool 13 and second stage tool 18. It is apparent that tool 13 should have a rake angle of at least 15° to produce a chip length ratio of 0.35, and that tool 18 should have a rake angle of at least 28°.

Figure 5:
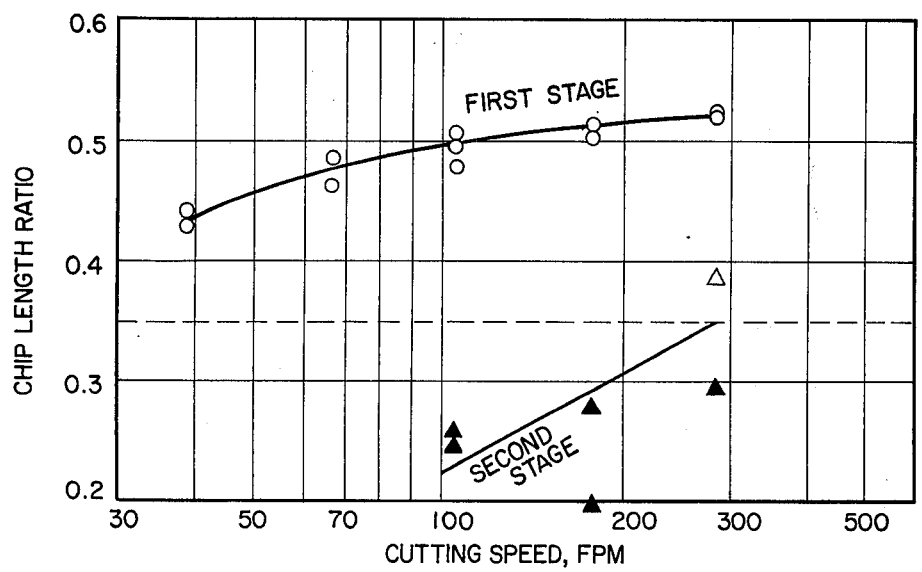
FIG. 5 is a similar graph of the effect of cutting speed on the relative length of chip.

The influence of cutting speed on chip length ratio is shown in FIG. 5. Satisfactory chip length ratios are obtained in the first stage operation with any cutting speed shown. Furthermore, increase in cutting speed from 40 to 300 feet per minute produces only a minor improvement in chip length ratio. In the second stage, however, a cutting speed of at least about 300 feet per minute is required to form a chip with a chip length ratio of 0.35. The tensile strength of continuous copper chips approximately 0.07 inch square having chip length ratio of 0.44 is about 65,000 pounds per square inch, which is in excess of the normal value of 60,000 pounds per square inch for fully worked copper.

We find that under optimum conditions in each case unworked cold drawn copper rod produces a greater chip length ratio then annealed rod, and that it is unnecessary to heat the copper rod before processing as herein described.

In the foregoing specification we have described presently preferred embodiments of our invention; however, it will be understood that our invention can be otherwise embodied within the scope of the following claims.

We claim:

1. The method of manufacturing wire from wire rod comprising moving the rod lengthwise successively past a slotted first cutting edge so as to shave from the rod a plurality of continuous confined chips and leave grooves in the rod separated by a plurality of lands and then past a second cutting edge so as to shave the lands from the rod as unconfined continuous chips, the confined chips being shaved off the rod at an angle sufficient to produce a ratio of worked to unworked chip length of at least about 0.35 and the unconfined chips being shaved off the rod at an angle different from the confined chip angle sufficient to produce a ratio of worked to unworked chip length of at least about 0.35, whereby continuous confined and unconfined chips are produced without cracking.

2. The method of claim 1 in which the rod is moved at a speed of at least about 300 feet per minute.

3. The method of claim 1 in which the angles of shaving are sufficient to produce a ratio of worked to unworked chip length at least about 0.50 both for confined and for unconfined chips.

4. The method of claim 1 in which the confined chips are shaved from the rod at an angle of at least about 15°.

5. The method of claim 1 in which the unconfined chips are shaved from the rod at an angle of at least about 28°.

6. The method of claim 1 including the step of drawing chips through a succeeding round die, in which the width and thickness of both confined and unconfined chips are made substantially equal, so that the drawn chips are round in cross section.

* * * * *